United States Patent [19]

Takada et al.

[11] Patent Number: 4,977,363
[45] Date of Patent: Dec. 11, 1990

[54] OVERHEAT PREVENTING SYSTEM OF A.C. MOTOR

[75] Inventors: Nobuharu Takada; Toshihiko Hirosaki, both of Kobe, Japan

[73] Assignee: Mitsubishi Denki Kabushiki Kaisha, Japan

[21] Appl. No.: 494,840

[22] Filed: Mar. 16, 1990

Related U.S. Application Data

[63] Continuation of Ser. No. 759,452, Jul. 26, 1985, abandoned.

[30] Foreign Application Priority Data

| Jul. 28, 1984 | [JP] | Japan | 59-158273 |
| Jul. 28, 1984 | [JP] | Japan | 59-158274 |
| Jan. 18, 1985 | [JP] | Japan | 60-7703 |
| Jan. 18, 1985 | [JP] | Japan | 60-7704 |
| Jan. 18, 1985 | [JP] | Japan | 60-7705 |
| Jan. 18, 1985 | [JP] | Japan | 60-7706 |

[51] Int. Cl.[5] .................................... H02P 7/48
[52] U.S. Cl. .................................... 318/771; 417/17; 417/53
[58] Field of Search ............ 318/771, 773–777; 417/17–20, 26, 43, 53

[56] References Cited

U.S. PATENT DOCUMENTS

| 4,225,289 | 9/1980 | Burkett | 417/3 |
| 4,370,605 | 1/1983 | Breznican | 318/773 |
| 4,413,218 | 11/1983 | Taylor et al. | 318/771 |
| 4,425,539 | 1/1984 | Wills | 318/771 |
| 4,434,394 | 2/1984 | Kellog et al. | 318/771 |
| 4,437,608 | 3/1984 | Smith | 263/13 |
| 4,468,171 | 8/1984 | Katsumata et al. | 417/53 |

FOREIGN PATENT DOCUMENTS

| 0137156 | 4/1985 | European Pat. Off. . |
| 2215414 | 12/1972 | Fed. Rep. of Germany . |
| 3243922 | 11/1982 | Fed. Rep. of Germany . |
| 2505940 | 11/1982 | France . |
| 2510841 | 2/1983 | France . |
| 58-6607 | 6/1983 | Japan . |
| 1405363 | 9/1975 | United Kingdom . |

Primary Examiner—David Smith, Jr.
Attorney, Agent, or Firm—Leydig, Voit & Mayer

[57] ABSTRACT

In the operation of an A.C. motor by switching the number of poles of the motor or the power sources of different frequencies, switching operating circuit is constructed to automatically switch so that the motor does not overheat by the above-described switching. Thus, the energy of the power sources can be saved.

2 Claims, 16 Drawing Sheets

FIG. I(a)
PRIOR ART
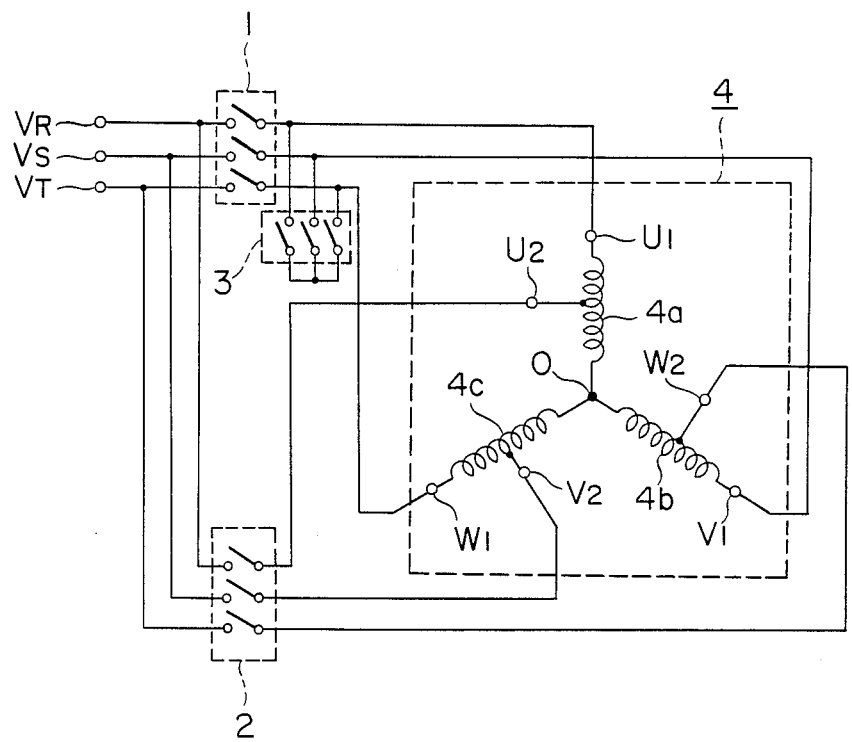
FIG. I(b)
PRIOR ART
| SW \ SP | H | L |
|---|---|---|
| SW1 | OFF | ON |
| SW2 SW3 | ON | OFF |

OVERHEAT PREVENTING SYSTEM OF A.C. MOTOR

This application is a continuation of application Ser. No. 06/759,452, filed Jul. 26, 1985, abandoned.

BACKGROUND OF THE INVENTION

This invention relates to the overheat preventing system of an A.C. motor.

When the number of poles or the frequency of a supplying power source of an A.C. motor is switched to operate the A.C. motor, an overheat is produced in the A.C. motor if the switching is not proper. This will be described in the below.

FIG. 1(a) shows a wiring diagram of a pole change motor. In FIG. 1(a), reference characters $V_R$, $V_S$, $V_T$ denote R-phase voltage, S-phase voltage, T-phase voltage, respectively of a three-phase A.C. power source, reference numerals 1, 2, 3 denote switches, reference numeral 4 denotes a pole change motor, reference numerals 4a, 4b, 4c denote the coils of the pole change motor 4, reference characters $U_1$, $V_1$, $W_1$ denote the terminals of the coils 4a, 4b, 4c, reference characters $U_2$, $V_2$, $W_2$ denote the intermediate terminals of the coils 4a, 4b, 4c, and reference numeral 0 denote the neutral point of the Y-connected coils 4a, 4b, 4c.

FIG. 2(a) shows an example of a conventional system for driving a fan by using a pole change motor. In FIG. 2(a), reference numeral 5 designates a fan, reference numeral designates 7 an air duct, reference characters 7a, 7b designate an inlet and an outlet, respectively of the air duct 7, reference numeral 8 designates an inlet vane for regulating the wind volume of the air duct 7, reference numeral 9 designates a wind volume command signal required by a system, and reference numeral 10 designates a controller for operating the opening of the inlet vane 8 upon receiving of the wind volume command signal 9. FIG. 2(b) shows a wiring diagram of the control circuit of the abovementioned system. Reference numerals 11, 12 designate control power sources, reference characters 1a, 2a designate contacts which become ON when the switches 1, 2 are closed, reference characters 1b, 2b, 3b designate contacts which becomes ON when the switches 1, 2, 3 are open, reference characters 1c, 2c, 3c designate operating coils (for closing the switches 1, 2, 3 when energized) of the switches 1, 2, 3, and reference characters $PB_H$, $PB_L$ designate push-button switches which produce high and low speed operation commands, respectively of the motor.

The operation of the motor will be then described. The states of the switches at high and low speed times are shown in FIG. 1(b).

The voltages $V_R$, $V_S$, $V_T$ of the three-phase A.C. power source are applied to the coil terminals $U_1$, $V_1$, $W_1$, respectively of the pole change motor 4 at the low speed time, and the coils 4a, 4b, 4c are connected at the neutral point 0 in a Y-connection.

On the other hand, the voltages $V_R$, $V_S$, $V_T$ of the three-phase power source are applied to the intermediate terminals $U_2$, $V_2$, $W_2$, respectively of the coils 4a, 4b, 4c at the high speed time to form a Y-connection with the neutral point 0 as a center and a Y-connection with the neutral point formed by the closure of the switch 3.

Thus, the intermediate terminals are provided in the windings of the motor to form a pole change motor by switching the currents flowed to the coils.

In FIG. 2(a), showing an example of the conventional system for driving the fan 5 by the above pole change motor 4, the air is fed by the fan 5 from the inlet 7a of the air duct 7 to the outlet 7b. The wind volume passing the air duct 7 is controlled by applying the wind volume command signal 9 from the system to the controller 10 which converts the signal to a value adapted to control the inlet vane 8 and controls the opening of the inlet vane 8.

Heretofore, the switching of the pole number of the pole change motor 4 has been performed manually in the following sequence.

When the push-button switches $PB_{H1}$, $PB_{H2}$ are now pressed at the low speed time, the coil 1c becomes no voltage by the opening of the switch $PB_{H1}$ to open the switch 1, and the contact 1b is simultaneously closed. Since the push-button switch $PB_{H2}$ for bypassing the contact 2a is closed, the coil 2c and then the coil 3c are energized to close the switches 2, 3, thereby switching the motor to the high speed operation. The push-button switch $PB_{H2}$ is reset when the switch is released, but the high speed operation is continued by the closure of the contact 2a. On the contrary, when the push-button switches $PB_{L1}$, $PB_{L2}$ are pressed at the high speed time, the coils 2c, 3c become no voltage by the opening of the push-button switch $PB_{L1}$ to close the contacts 2b, 3b. Since the push-button switch $PB_{L2}$ for bypassing the contact 1a is closed the voltages of the control power sources 11, 12 are applied to the coil 1c to close the switch 1, thereby switching the motor to the low speed operation. The push-button switch $PB_{L2}$ is reset when the switch is released, but the low speed operation is continued by the contact 1a.

Since the operating system of the conventional pole change motor is constructed to be switched manually as described above, if the switching of the motor to the high speed is delayed, or motor is not switched to high speed operation due to a careless operator, the output required may be greater than the output of the motor at low speed. Thus, the conventional motor has such disadvantages that the operator must always take a notice for the operation of the conventional pole change motor. Further, since the switching of the motor to low speed operation may be delayed when becoming the output required is less than the output of the motor at the high speed, conventional pole change motor has such a disadvantage that the effect of electric power energy-saving cannot be performed.

Then, FIG. 3 shows a prior-art variable frequency power source system. In FIG. 3, reference numeral 51 designates a commercial power source (hereinafter referred to as "C power source"), reference numeral 52 designates a variable frequency power source (hereinafter referred to as "V power source"), reference numerals designate 53, 54, 55 switches, reference numeral 56 designates a motor selectively energized from the C power source 51 or the V power source 52, reference numeral 57 designates a rotor driven by the motor, reference numeral 58 designates a fluid passage, reference characters 58a, 58b designate an inlet and an outlet, respectively of the fluid passage 58, reference numeral 59 designates a control mechanism for controlling the fluid flow rate passing the fluid passage 58, reference numeral 60 designates a fluid controller, reference numeral 61 designates a control input to the controller 60, reference character 60a designates a converter for converting the control input into a control signal adapted for the number of revolution of the V power source 52 and the control mechanism 59, reference characters 60b, 60f, 60g designate contacts for opening or closing the control signal, and reference character 60e designates a signal generator.

Then, the operation of the conventional variable frequency power source system will be described. FIG. 3 will be described as an example of a fan for a boiler of a generating plant for the convenience of readily understandable description. In this case, the rotor 57 is a fan, the control mechanism 59 is an inlet vane, and the fluid passage 58 is an air duct.

When the V power source is operating, the switches 54, 55 are closed, and the switch 53 is opened. The motor 56 is energized by the V power source 52, and driven. The output of the V power source 52 is variable in the frequency F, and the number N of revolution of the motor 56 becomes as represented by the following equation:

$$N = \frac{120}{P} \times F \qquad \text{(Equation 1)}$$

The motor 56 is operated in the frequency F at the variable speed. The voltage $E_M$ (namely, the output voltage of the V power source 52) of the motor 56 is constant as $E_M$=constant so as to avoid the saturation of the core of the motor 56 as represented by the following equation:

$$E_M/F = K \qquad \text{(Equation 2)}$$

Thus the motor 56 is in general operated.

The fan 57 is driven by the motor 56. Therefore, the wind volume flowed to the air duct 58 is controlled by the number N of revolution of the motor 56, namely, the output frequency F of the V power source 52. At this time, the inlet vane 59 is necessary to reduce the resistance of the air duct 58 to perform the electric power energy-saving, and maintained in the constant opening in the full opening state or in the vicinity of full opening state.

Here, during the V power source operation, the contacts 60b, 60f are closed, and the contact 60g is opened. The control input 61 of wind volume is converted by the converter 60a into a signal adapted for the V power source 52, applied to the V power source 52 through the contact 60b, thereby controlling the frequency F of the V power source 52 to become the desired wind volume.

During the V power source operation, the inlet vane 59 receives the constant vane opening signal from the signal generator 60e through the contact 60f, thereby maintaining the constant opening in the vicinity of full opening.

On the other hand, at the C power source operation time the switch 53 is closed, and the switches 54, 55 are opened. The motor 56 is driven by the C power source 51, namely by the constant commercial power source frequency Fc, and accordingly the fan 57 is rotated at the constant speed. In this case, the fluid in the air duct 58 is controlled by the inlet vane 59.

More particularly, at the C power source operation time, the contacts 60b, 60f are opened, and the contact 60g is closed. The control input 61 of air flow rate is converted by the converter 60a into a signal adapted for controlling the inlet vane 59, and applied to the inlet vane 59 through the contact 60g. Thus, the opening of the inlet vane 59 is controlled to establish the desired wind volume.

The switching of the V power source 52 to the C power source 51 is achieved by opening the switches 54, 55, opening the contacts 60b, 60f and closing the switch 53 and closing the contact 60g.

When the V power source 52 must supply electric power to a large-capacity motor, the power source is not constructed to supply the maximum output of the motor so as to economically manufacture the power source, but is frequently fabricated in the capacity of the degree capable of supplying the electric power in an ordinary operation. In the case of the example of this fan, when the capacity of the V power source is formed to x % of the commercial frequency Fc in the operating frequency limit, it can become the value substantially proportional to $(x/100)^3$.

For example, when the power factor $\cos \theta = 85\%$ and the motor efficiency $\mu =$ is 90% in the motor of 1000 kW, if the motor is intended to operate in its capacity of 1000 kW with the V power source, the power source requires approximately for the following capacity:

$$\frac{1000}{0.85 \times 0.9} \approx 1810 \, KVA$$

but if the ordinary operation of the motor is in a range of x=80% of the commercial frequency Fc, the capacity of the V power source can be selected to the following capacity:

$$1810 \times \left(\frac{80}{100}\right)^3 \approx 670 \, KVA$$

Therefore, the switching from the V power source to the commercial power source 51 can be performed during the V power source operation. Heretofore, the abovementioned switching operation has been manually carried out on the basis of the manual judgement.

More specifically, since the switching of the V power source to the C power source has been heretofore performed manually according to the operator's judgement, this had various drawbacks and disadvantages that it is always necessary to pay an attention that the motor has been operated within the capacity of the V power source and there was a danger of burning out the V power source due to the overheat by the overload of the V power source due to the operator's careless mistake and the necessary output could not be always attained.

SUMMARY OF THE INVENTION

This invention has for its object to provide an overheat preventing system of an A.C. motor wherein the motor can be automatically efficiently switched so as not to overheat to perform electric power energy-saving when a power source circuit is switched in response to a load of the motor such as for example when the number of poles of a pole change motor is switched or a commercial frequency power source and a variable frequency power source are switched.

BRIEF DESCRIPTION OF THE DRAWINGS

FIG. 1(a) is a circuit diagram of a prior-art pole change motor;

FIG. 1(b) is a view of the operation of a switch of a motor circuit of FIG. 1(a);

In the drawings, the same symbols indicate the same parts.

DESCRIPTION OF THE PREFERRED EMBODIMENTS

Figure 4:
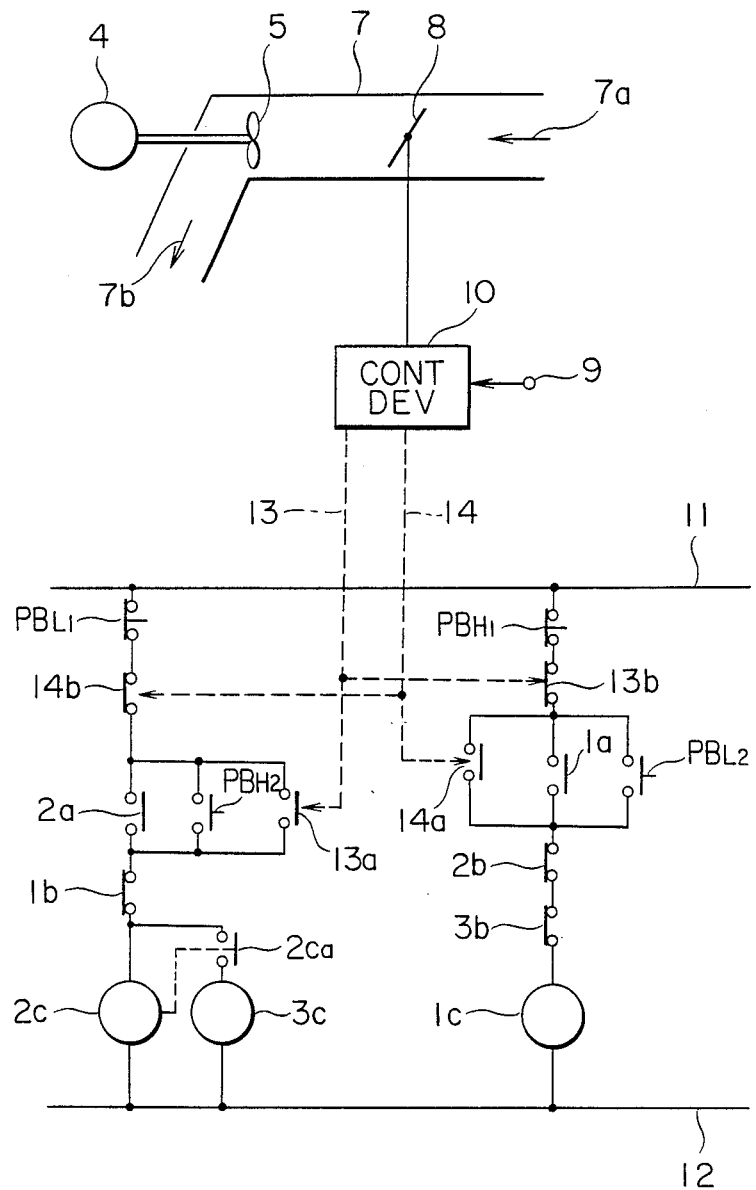
FIG. 4 is an explanatory view showing an embodiment of the present invention for explaining the drive of a fan by the conversion of the pole number of the pole change motor.

Embodiments of the present invention will be described in detail with reference to the accompanying drawings. FIG. 4 shows an embodiment for controlling the drive of a fan by the conversion of the pole number of a pole change motor. In FIG. 4, reference numeral 13 designates an output signal of a first step detector (not shown) for outputting a signal for a predetermined period of time when an opening signal of an inlet vane 8 of a controller 10 becomes a first predetermined value or higher, reference numeral 14 designates an output signal of a second step detector (not shown) for outputting a signal for a predetermined period of time when the opening signal of the inlet vane 8 becomes a second predetermined value or lower, reference characters 13a, 14a designate contacts closed when the first or second output signal 13, 14 is outputted, and reference characters 13b, 14b designate contacts opened when the first or second output signals 13, 14 are outputted.

Figure 2A:
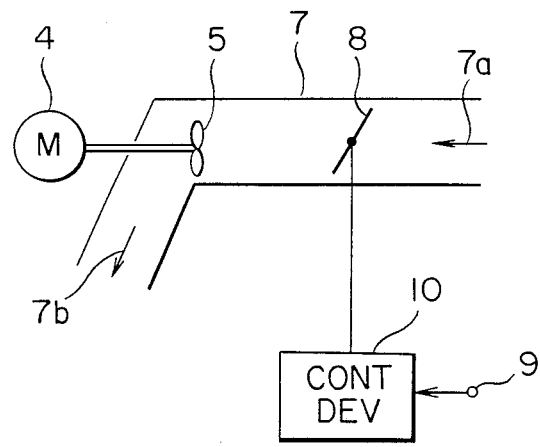
FIG. 2(a) is an explanatory view for explaining the drive of a fan by the above motor.
Figure 2B:
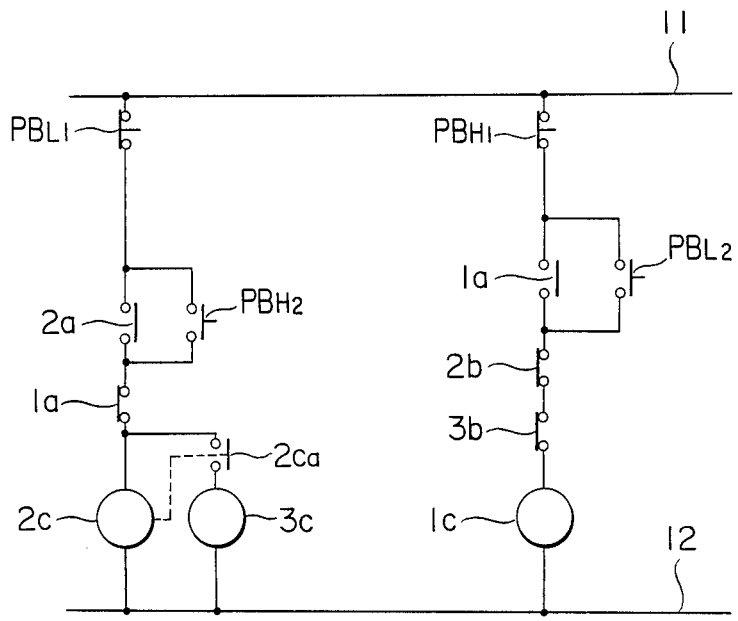
FIG. 2(b) is a circuit diagram of the prior-art operating circuit for switching the pole number of the above motor.
Figure 5:
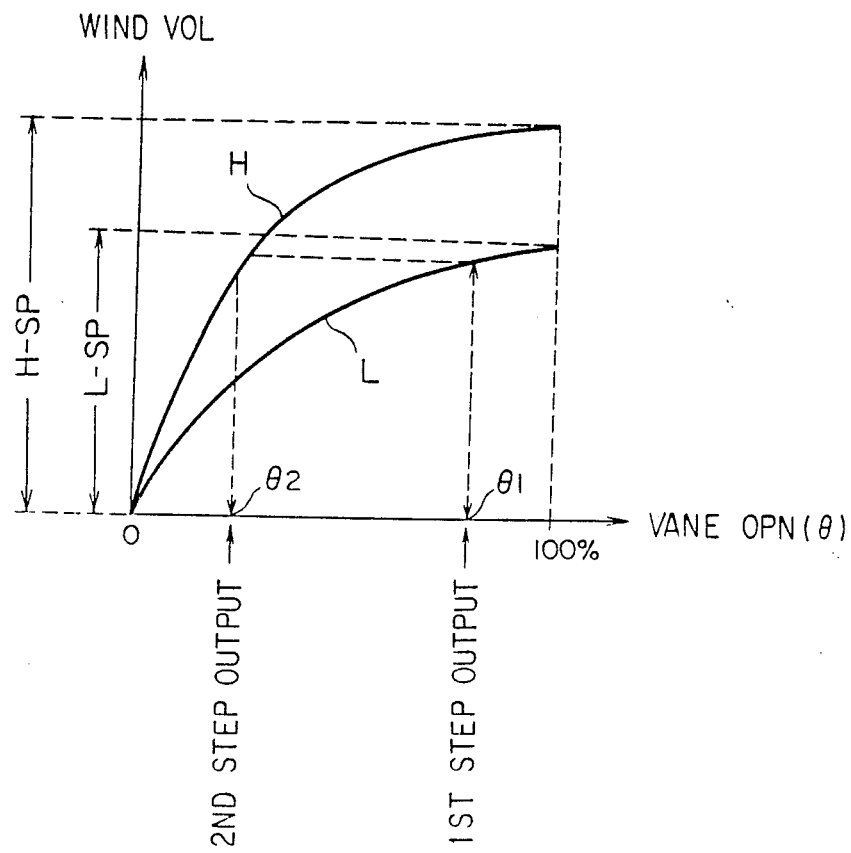
FIG. 5 is a characteristic diagram for explaining the conversion of the pole number of FIG. 4.

The same reference numerals and characters as those of FIGS. 2(a) and 2(b) denote the same members. FIG. 5 is a view for explaining the detecting sensitivity of the abovementioned first and second detectors, reference characters H, L are curves indicating the relationship between the opening of the vane and the output wind volume, and reference characters $\theta_1$, $\theta_2$ are set values of the openings corresponding to the first and second opening signals.

The embodiment of the present invention will be described. When the opening signal to the inlet vane 8 of the controller 10 exceeds the vane opening $\theta_1$ set to the first detector at the low speed operation time, the first detector outputs a signal 13 for a predetermined period of time, the contact 13a is closed and the contact 13b is opened during this period. Thus, the coil 1c becomes no voltage to open the switch 1 and to close the contact 1b. Accordingly, the signal 13 performs the same effect as when the push-button switch $PB_{H2}$ is pressed in the description with respect to FIG. 4, thereby automatically switching to the high speed operation.

When the opening signal to the inlet vane 8 of the controller 10 becomes the vane opening $\theta_2$ or lower set to the second step detector 14 at the high speed operation time, the second step detector outputs a signal 14 for a predetermined period of time. The contact 14a is closed and the contact 14b is opened during this period. Thus, the coils 2c, 3c become no voltage to open the switches 2, 3 and to close the contacts 2b, 3b. Accordingly, the signal 14 performs the same effect as when the push-button switch $PB_{L2}$ is pressed in the description with respect to FIG. 2, thereby automatically switching to the low speed operation.

FIG. 5 is a view for explaining the set values $\theta_1$, $\theta_2$ of the first and second step detectors. The opening $\theta$ of the vane 8 is controlled to 0 to 100%, and FIG. 5 shows the states of the output wind volumes by the curves H and L at the high and low speed operation times.

When the first step detector is set to $\theta_1$ in the vicinity of 100% of the vane opening at the low speed operation time, the motor can be automatically switched to the high speed when the necessary system wind volume is raised to the vicinity of the upper output limit at the low speed operation time.

On the other hand, when the second step detector is set to the vane opening $\theta_2$ corresponding to the point of the wind volume smaller (but in the vicinity of) than the wind volume obtained by the opening $\theta_1$ set by the first step detector in the low speed operation zone at the high speed operation time, the motor can be automatically switched to the low speed when the necessary system wind volume is lowered to the range that can be operated at the low speed operation time.

The reason why the wind volume obtained by the vane opening $\theta_2$ at the high speed time is set to that smaller than that obtained by the vane opening $\theta_1$ at the low speed time is because it is prevented from again switching to the high speed operation immediately when the motor is switched from the high speed operation to the low speed operation.

In the embodiment described above, the example that the fan 5 is driven by the pole change motor 4 is exemplified. However, other rotors such as a pump or a compressor may also be driven in the embodiment of the present invention.

The above embodiment has been explained with respect to the example that the opening of the inlet vane 8 of the fan 5 is detected by the first and second step detectors for detecting the output of the motor at the low and high speed operation times. However, the same effect can also be provided as the above embodiment by using the motor voltage or current to represent the output of the motor.

Figure 6:
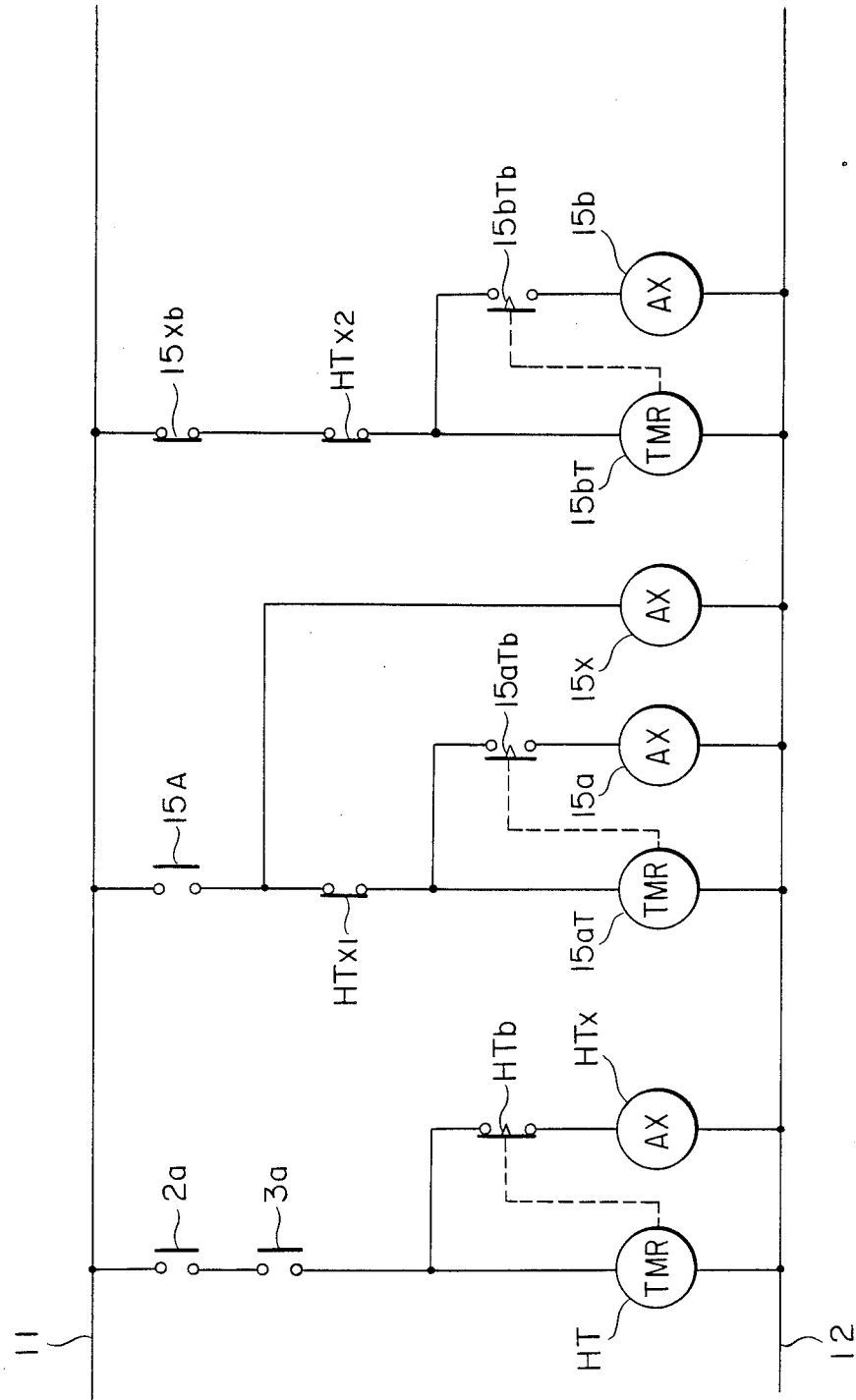
FIGS. 6 to 11 are circuit diagrams showing other embodiments of the present invention and the operating circuit for switching the pole number of a pole change motor.

The prevention of the overheat of the pole change motor can also be performed by preventing the switching of the next operation until the motor temperature has lowered sufficient to avoid overheating upon the switching of the next high or low speed operation. Another embodiment of the present invention to perform this object is shown in FIG. 6. In FIG. 6, reference characters HT, 15aT, 15bT designate timers, reference characters HTX, 15a, 15b, 15x designate auxiliary relays, HTx1, HTx2 designate the contacts of the auxiliary relays HTx, reference character 15Xb designates the b-contact of the auxiliary relay 15X, reference characters HTb, 15aTb, 15bTb designate the contacts of the timers HT, 15aT, 15bT, reference character 15A designates the contact closed when a load detector is operated, and reference characters 2a, 3a designate contacts becoming ON when the switches 2, 3 are closed.

Then, the operation of the circuit arrangement in FIG. 6 will be described.

Figure 9:
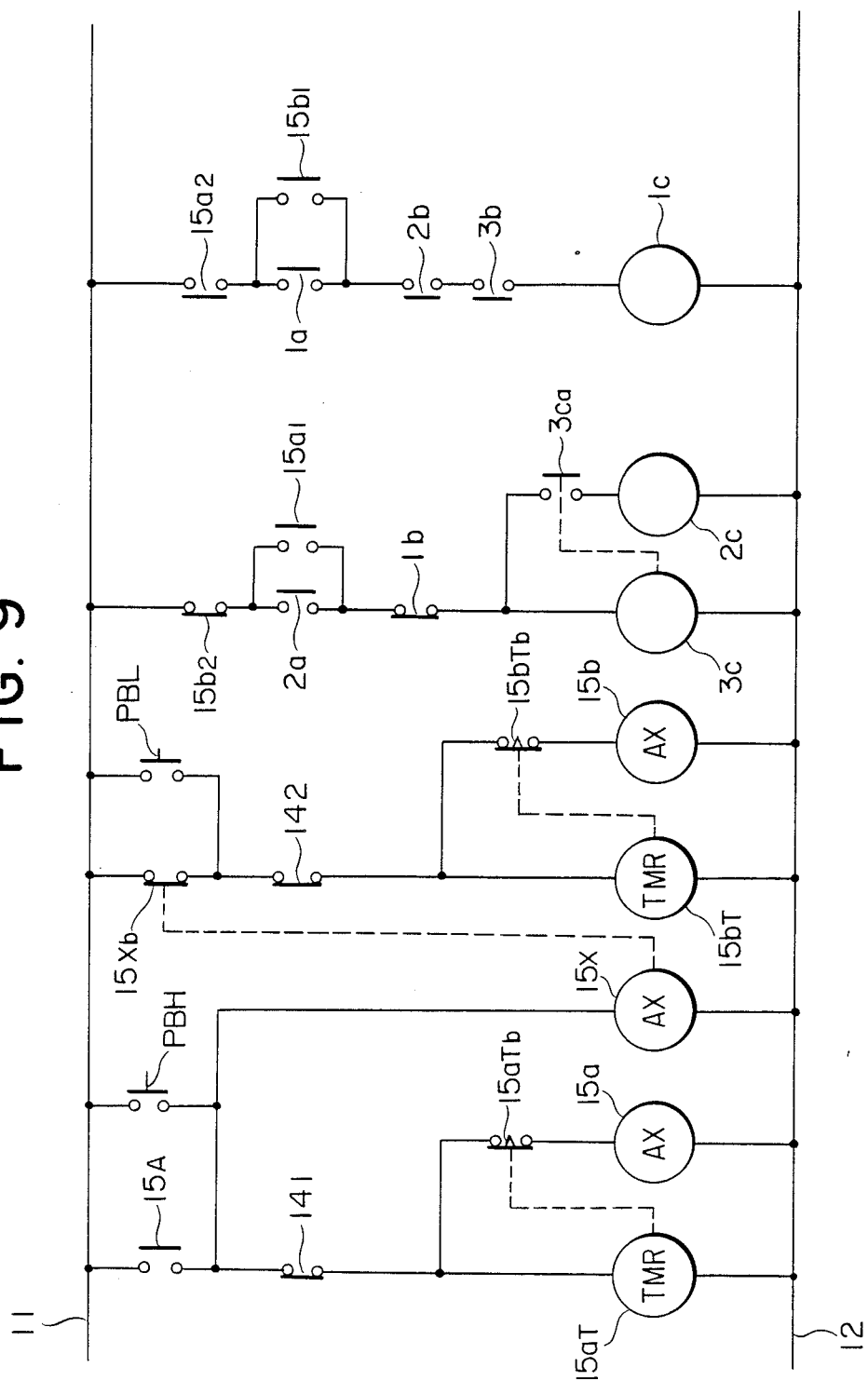

When the load detector (not shown) operates to judge that the load is to be operated in the high speed range, the contact 15A is closed, the auxiliary relay 15a is operated during the timer time of the timer 15aT under the condition that the auxiliary relay HTx is not operated. Thus, the a-contact 15a1 of FIG. 9 is closed during the timer time of the timer 15aT to open the switch 1 and to close the switches 2, 3.

Then, when the speed of the load is decelerated so that the load detector is reset, the auxiliary relay 15X is reset, and the auxiliary relay 15b is closed during the timer time of the timer 15bT under the condition that the auxiliary relay HTx is not operated. Thus, the a-contact 15b1 of FIG. 9 is closed during the timer time of the timer 15bT to open the switches 2, 3 and to close the switch 1.

When the load detector is operated to close the switches 2, 3, the contacts 2a, 3a are closed to operate the auxiliary relay HTx during the timer time of the timer HT, thereby stopping the operations of the auxiliary relays 15a, 15b by the contacts HTx1, HTx2.

When the load detector is operated to close the switches 2, 3 to switch the load to the high speed operation, the operation of the auxiliary relay 15b is stopped by the opening of the contact HTx2 of the auxiliary relay HTx during the timer time of the timer HT even if the load detector is reset, thereby operating the auxiliary relay 15b after the timer time of the timer HT for sufficiently cooling the motor and switching the motor to the low speed.

The overheat of the motor is in general larger when the motor is switched from low speed to high speed than when the motor is switched from the high speed to the low speed. When the contact HTx2 is shorted, the motor is immediately switched to the low speed when the load detector is reset, but the switching from the low speed to the high speed is stopped during the timer time of the timer HT by the contact HTx1 of the auxiliary relay HTx. The stop of the switching by the contact HTx1 cannot be countermeasured to the increase in the load in this case since the next switching to the high speed operation is stopped, but the electric power-saving is increased. On the other hand, in case of stopping the switching by the contact HTx2, it can countermeasure the increase in the load since the switching to the low speed operation is stopped, but the electric power-saving is decreased. In other words, the stop of switching from high speed to low speed or vice verse is determined by the thought of which of the countermeasure to the load and the electric energy-saving as an important factor.

Figure 7:
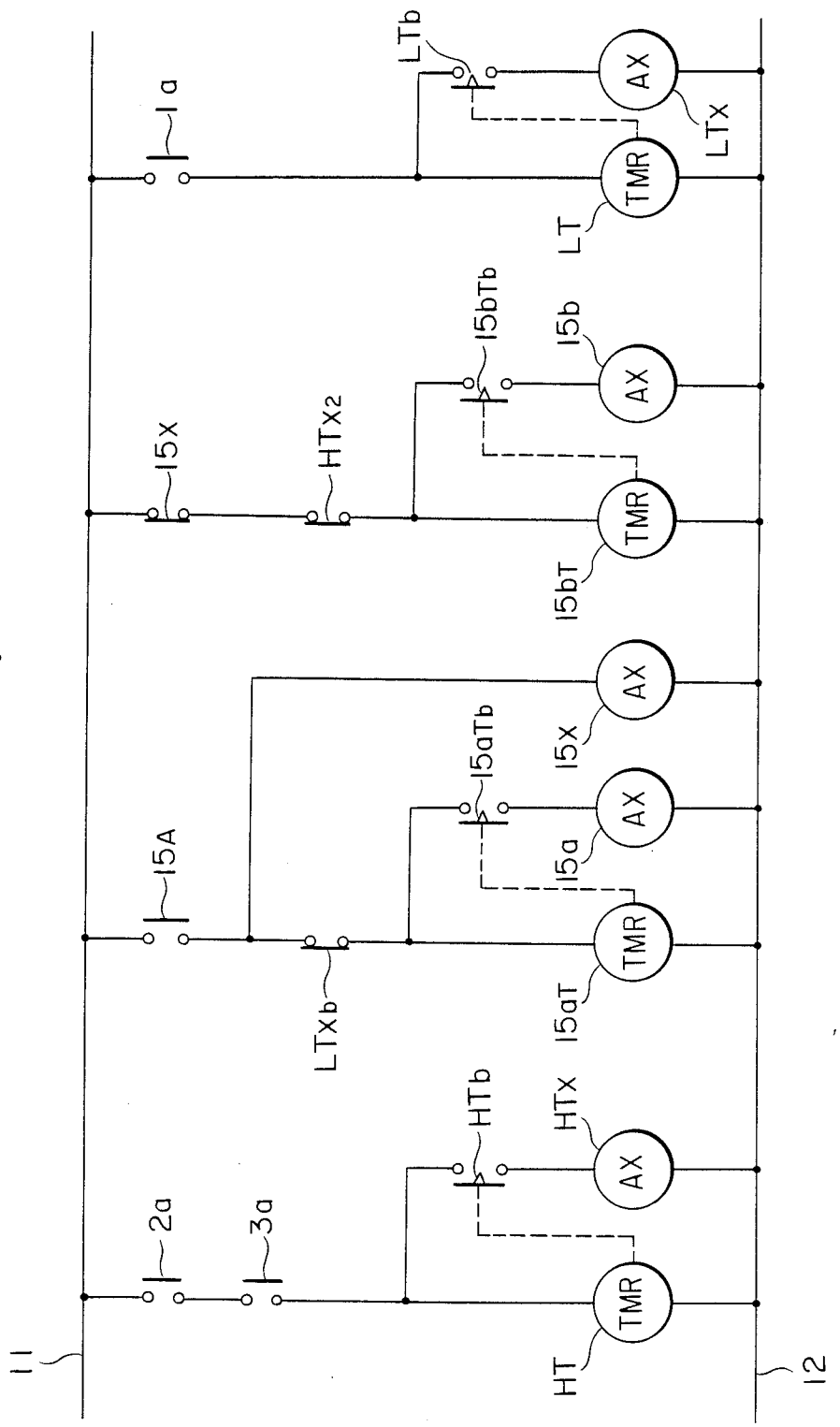

FIG. 7 shows another embodiment of FIG. 6 of present invention, reference character LT designates a timer, and reference character LTx designates an auxiliary relay. This embodiment operates as follows. When a load detector is operated to close the switches 2, 3, the operation of the auxiliary relay 15b is stopped during the timer time of the timer HT by the auxiliary relay HTx2 to stop the switching to the low speed. When the load detector is reset to close the switch 1, the switching to the high speed is stopped by the opening of the contact LTxb during the timer time of the timer LT by the auxiliary relay LTx. This is because the overheat of the motor of the switching from the low speed to the high speed is larger than that of the switching reversely, and the operation is performed by setting the time limit of the timer to LT<HT.

Figure 8:
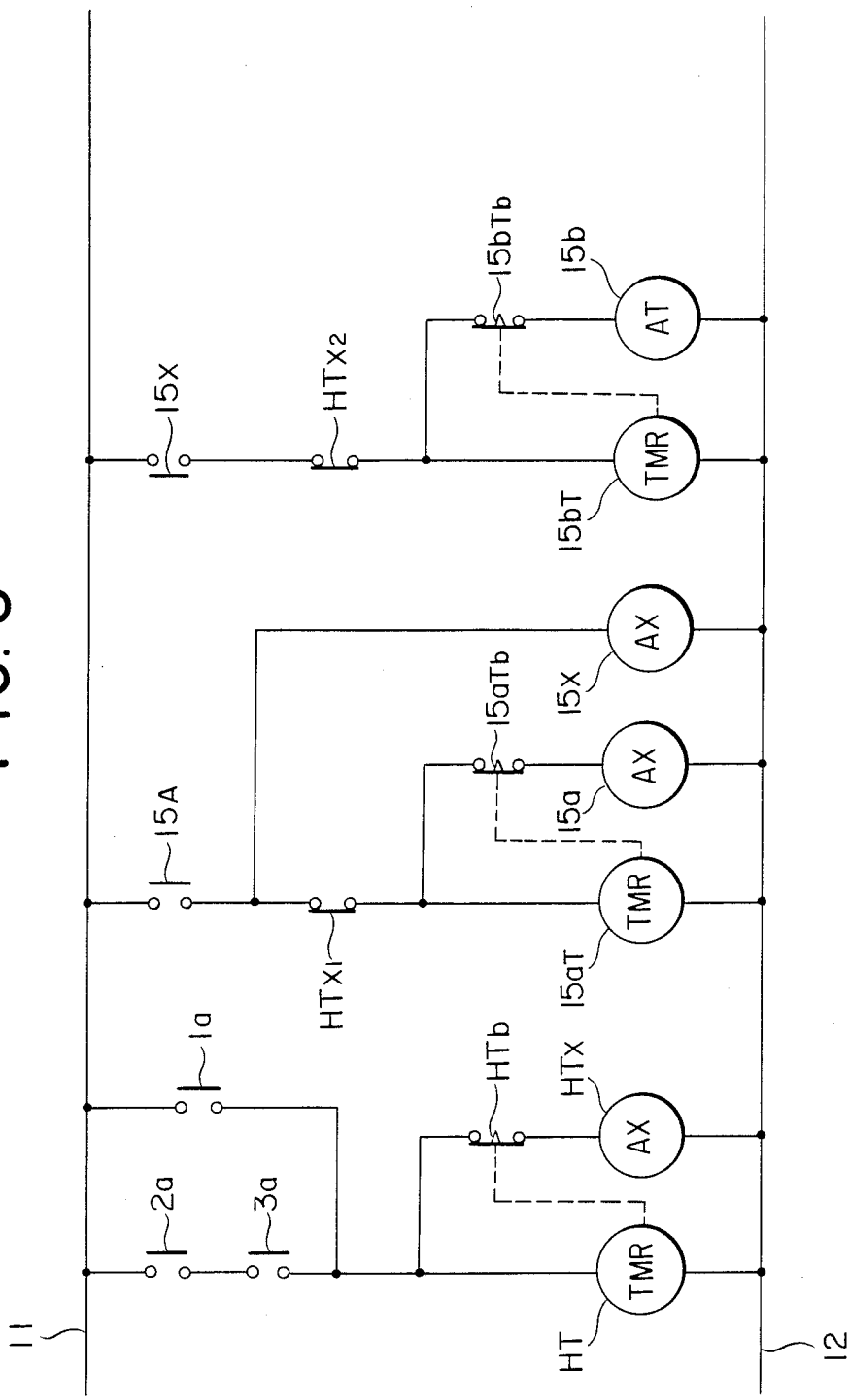

FIG. 8 shows still another embodiment of FIG. 6 of the present invention, which adds the driving conditions of the timer HT and the auxiliary relay HTx in which "a contact 1a closed when the switch 1 is closed" in parallel with "a series circuit of the contacts 2a and 3a". Thus, the switching condition is stopped in both high and low speed operation times. Any or both of the contacts HTx1 and HTx2 may be used in the same manner as the description of FIG. 6.

It becomes apparent as described with respect to the above embodiments that the condition of continuing the stopping of the switching during a predetermined period of time is to start the timer (HT or LT) by the switching of at least one of the switching from low speed to high speed and vice versa and to stop at least one next switching.

In the embodiments described above, the stopping of the switching at the automatic switching time by the load detector has been described. However, the switching by push-buttons PBH, PBL may be also employed for the stopping of the switching.

The prevention of the overheat of a pole change motor can also be performed by providing a temperature detector for detecting the fact that the temperature of the pole change motor becomes a predetermined value or higher to stop the switching from low speed to high speed of the motor when the detector is operating, thereby preventing the overheat of the pole change motor.

FIG. 9 shows another embodiment of the present invention to achieve the abovementioned object. In FIG. 9, reference numerals 141, 142 designate contacts for forming an interlock opened when a temperature detector (not shown) for detecting the temperature of a pole change motor 4 detects a predetermined value or higher, reference characters 15aT, 15bT designate timers, and reference character 15A designates the output contact of a load detector closed when detecting a predetermined load or higher. Reference character 15X designates an auxiliary relay driven by the output contact 15A, reference character 15Xb designates its contact, and reference characters 15aT, 15bTb designate the contacts of the timers 15aT, 15bT.

The auxiliary relay 15a is operated by a high speed operation command signal formed by the operation of the push-button PBH or the closure of the output contact 15A of the load detector during the timer time of the timer 15aT, and the auxiliary relay 15b is operated by a low speed operation command signal formed by the operation of the push-button PBL or the reset of the output contact 15A of the load detector during the timer time of the timer 15bT.

When the auxiliary relay 15a operates for a predetermined period of time, the switch 1 is opened, and the switches 2, 3 are closed. Thus, the motor is switched to the high speed. When the auxiliary relay 15b operates for a predetermined period of time, the switches 2, 3 are opened, and the switch 1 is closed. Thus, the motor is switched to the low speed. In FIG. 9, since the opening and closing conditions (the temperature of the motor is a predetermined value or lower) of the contacts 141, 142 operated when the temperature detector is operating are added to the operating conditions of the auxiliary relays 15a, 15b, the switching is not performed even by the manual switching by the push-buttons and the switches and by the automatic switching because the auxiliary relays 15a, 15b are not operated when the temperature detector detects a predetermined value or higher.

If the temperature detector detects the high temperature when the load detector is operated by the increase in the load during the low speed operation, the switching to the high speed of the motor is locked, and when the temperature detector is reset, the switching of the motor to the high speed can be performed.

Similarly, even if the load detector is reset during the high speed operation, the switching is locked if the temperature detector detects the high temperature, and the switching of the motor to the low speed can be performed when the temperature detector is reset.

In the embodiment described above, both the manual switching and the automatic switching are interlocked by the temperature detector. However, the present invention is not limited to the particular embodiment. Since the manual switching can be performed by the judgement of the circumstances by an operator by the display of the operation of the temperature detector, only the automatic switching may be interlocked by the temperature detector. For example, as shown in FIG. 10, the push-button switch PBL may be provided in the bypass circuit of the contact 15b1.

Figure 10:
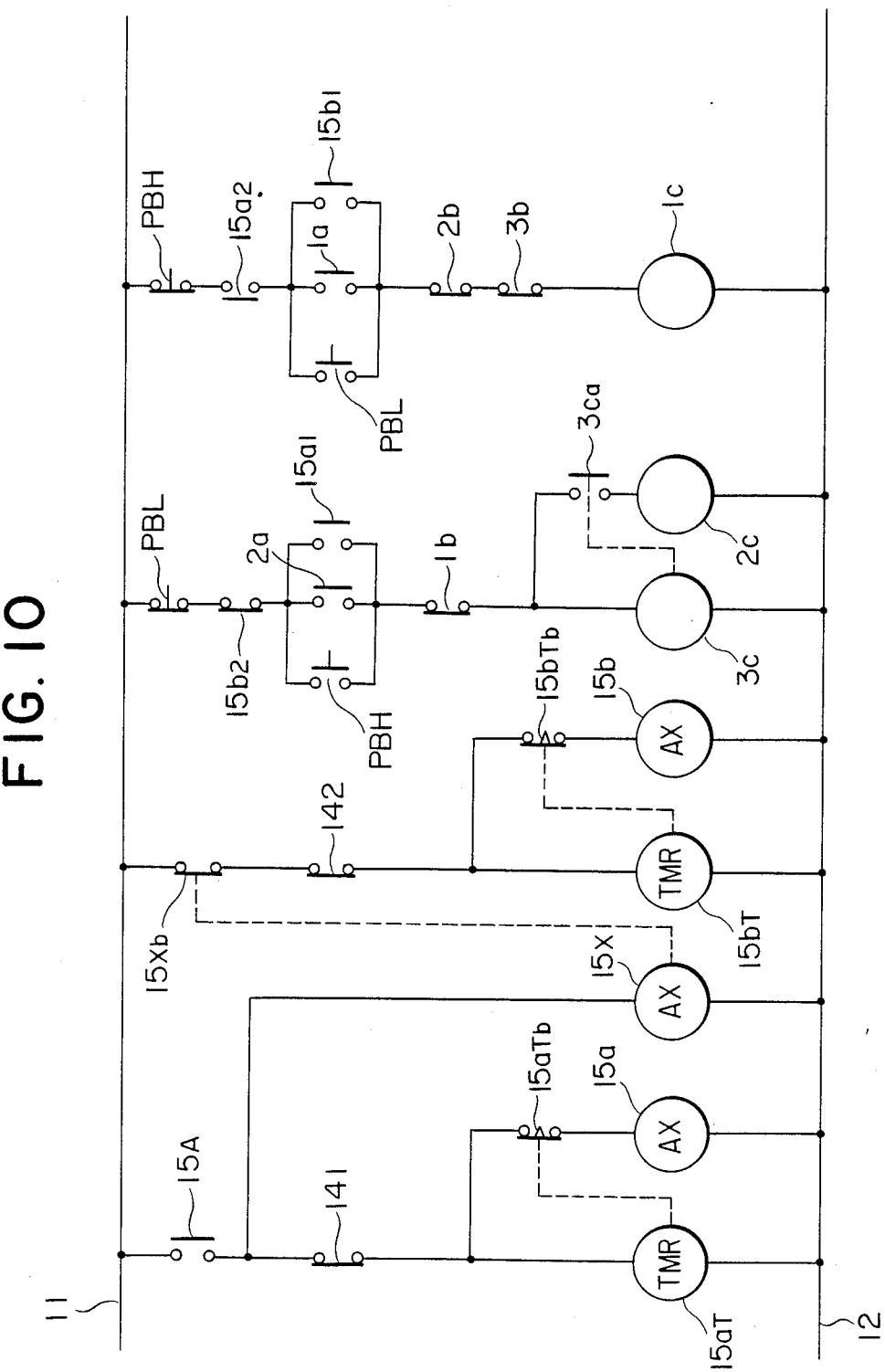

In the embodiments shown in FIGS. 9 and 10, the switching of the motor from high speed to low speed and vice versa is interlocked by the temperature detector. However, the same effect can also be provided even if either one switching may be interlocked. Particularly, in FIG. 11, an example that the contact 141 is omitted and the automatic switching from the high speed to the low speed is interlocked by the temperature detector 142, thereby stopping the switching from the low speed to the high speed of the motor is shown.

As described above, a method of locking the switching from the high speed to the low speed of the motor can cool the overheat at the high speed of the rotating speed of the motor, and can accordingly cool in a short time. Further, this method has such an advantage that, even if the operation in the low speed range is required, the operation can be continued by the vane. In other words, if only the switching of the motor from the low speed to the high speed is locked by the temperature detector, the motor is operated at the low speed, and it takes a long period of time to cool, and when the operation in the high speed range is again required, the motor cannot follow the operation request in the low speed, and another means for correcting the request command to the low speed range is separately required.

Figure 11:
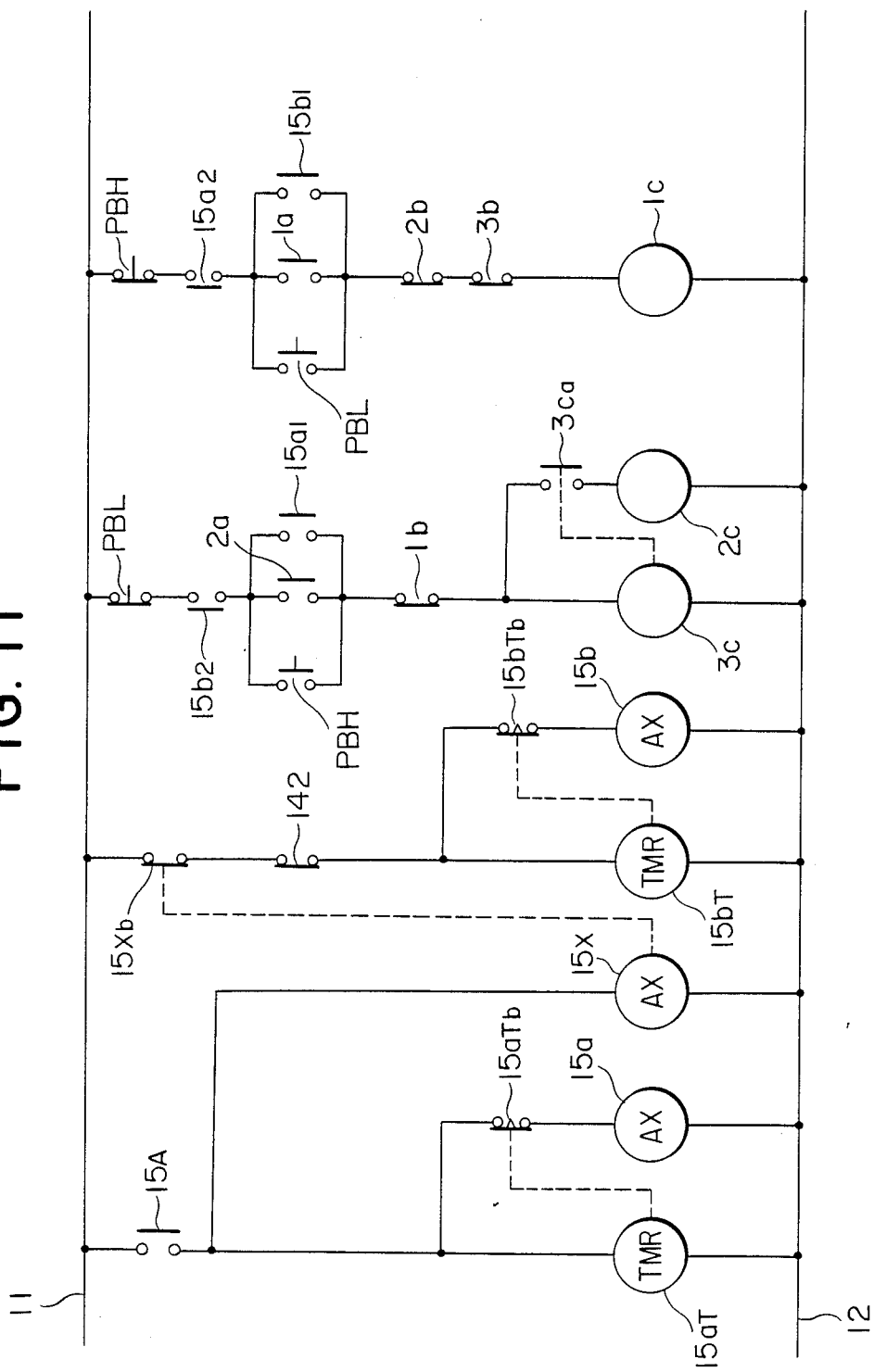

In FIG. 11, only the automatic switching to the low speed is interlocked by the contact 142 of the temperature detector. However, it is apparent that the manual switching to the low speed by the push-button switch PBL may be added to the interlock.

In the embodiments described above, the switching of the pole change motor between the high speed and the low speed is performed when the temperature of the pole change motor is a predetermined value or lower. Therefore, this embodiment provides effects that the pole change motor is not abnormally overheated and the transient heat at the switching time is not accumulated.

Figure 12:
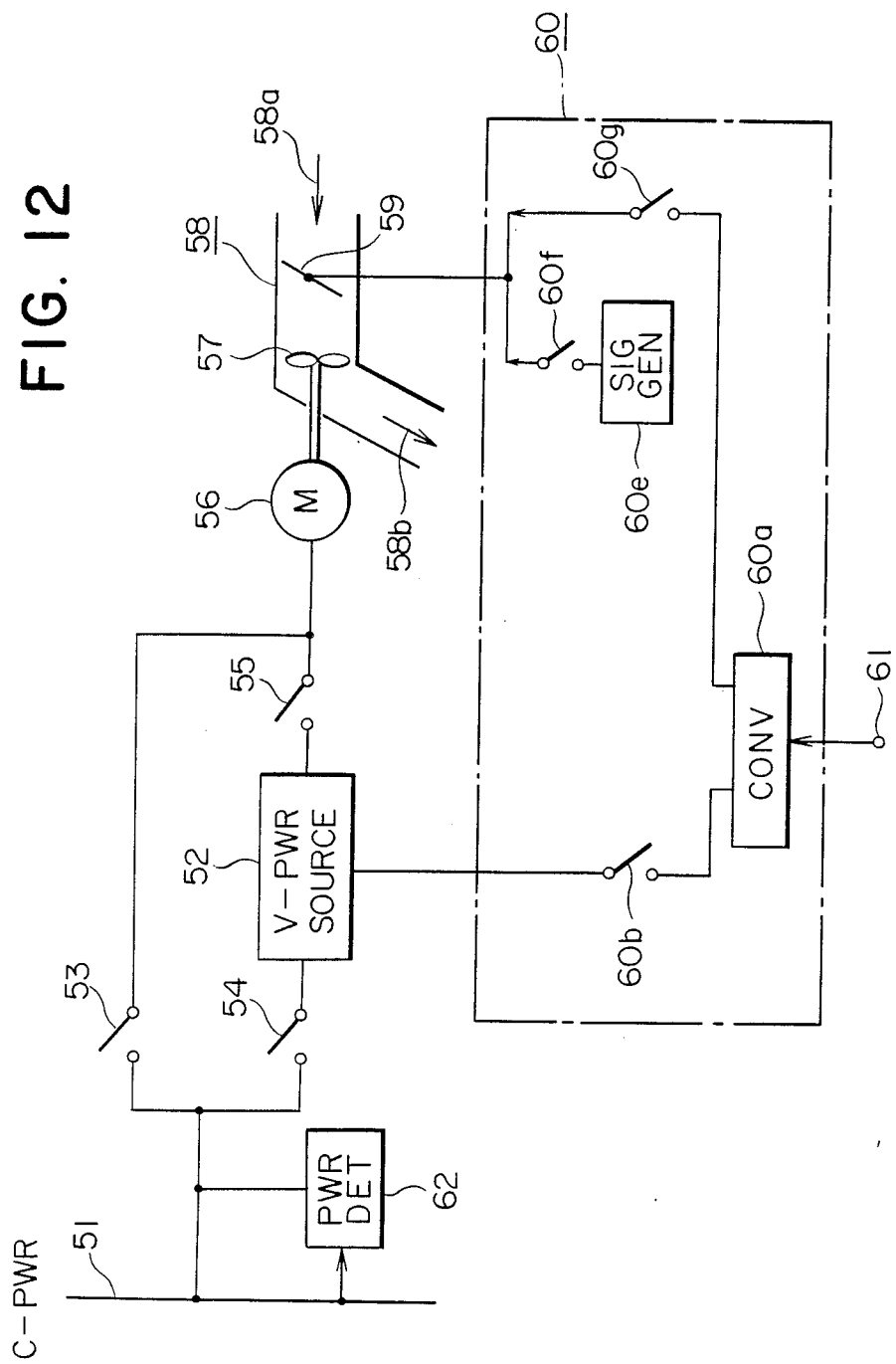
FIGS. 12 to 16 are circuit diagrams showing still another embodiments of the present invention and for switching the power source for controlling the motor by the switching of a commercial frequency power source and a variable frequency power source.
Figure 13:
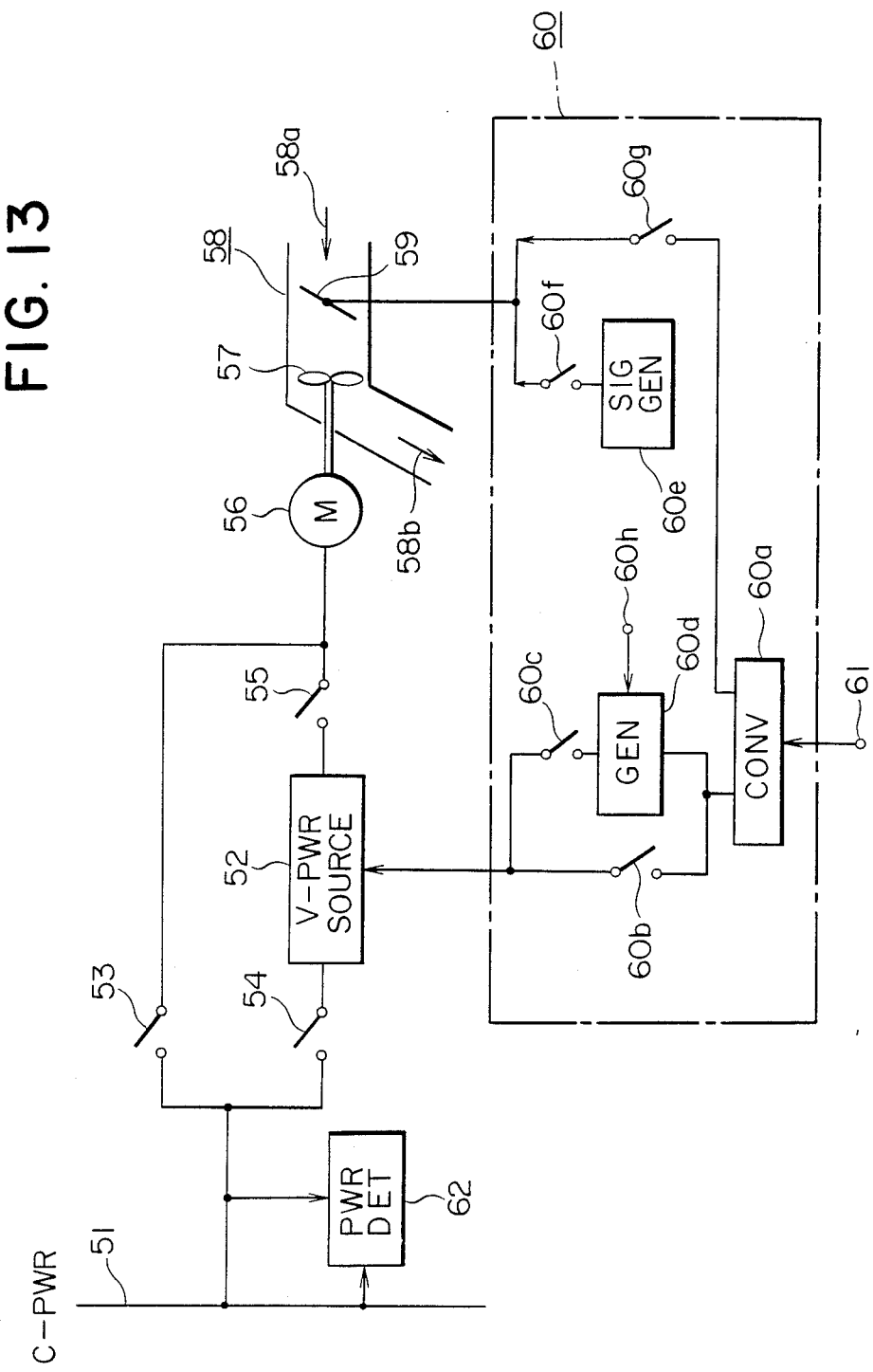

Still another embodiment of the variable frequency power source system will be described with reference to FIGS. 12 and 13. In FIGS. 12 and 13, reference character 60c designates a contact, reference character 60d designates a function generator, reference character 60h designates the start command terminal of the function generator 60h, and reference numeral 62 designates a power detector.

Figure 3:
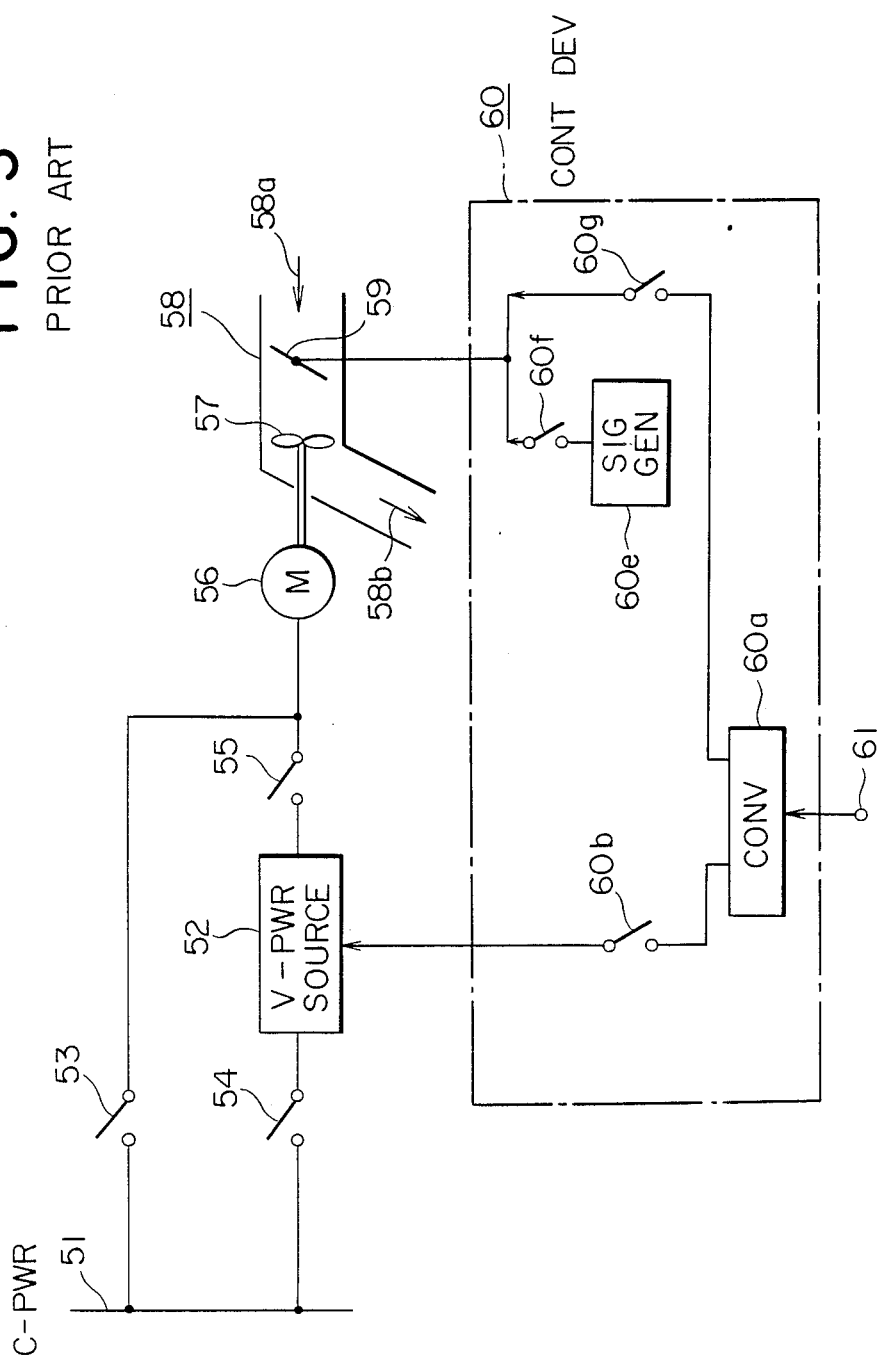
FIG. 3 is an explanatory view for explaining the construction of a prior-art motor control circuit for driving a fan by the switching of a commercial frequency power source and a variable frequency power source.

The other construction is the same or equivalent to that in FIG. 3, and the description will be omitted.

The operation of the embodiment in FIG. 12 will be first described. In FIG. 12, the power detector 62 is added to the arrangement in FIG. 3. The voltage of the commercial power source 51 to be applied to the V power source 52 and the current flowed to the motor 56 are applied to the power detector 62 which is constructed to thus calculate the supplied power to the motor 56 and to produce an output when detecting a predetermined value or higher. The predetermined value of the power is selected to the capacity of the V power source or the value near the capacity of the V power source, and when the power detector 62 is operated, the switches 54, 55 are opened, the switch 53 is closed, the contacts 60b, 60f are opened, and the contact 60g is closed. Thus, even when a command for increasing more than the capacity of the V power source 52 is outputted from the control input 61 of the system during the operation of the V power source, the power detector 62 is operated, the power to the motor 56 is automatically switched from the V power source 52 to the C power source 51. Thus, the burnout loss of the V power source 52 can be avoided, the constant precaution of an operator can be eliminated, and the fluid amount required for the system can be attained.

Then, the operation of the embodiment in FIG. 13 will be described. In FIG. 13, a contact 60c, a function generator 50d and a start command terminal 60h to the function generator 60d are added to the arrangement in FIG. 12. It is ordinary that the detecting value of the power detector 62 is set to approx. 85 to 95% of the capacity of the V power source by considering the measuring error for the safety of the V power source 52. When the power source 62 is operated to switch from the V power source 52 to the C power source 51, the power source frequency to the motor 56 is raised from the low frequency Fv to the high frequency Fc of the commercial power source 51, the motor 56 is accelerated, and the fluid amount of the air duct 58 accordingly tends to increase. When switched to the C power source 51, the contact 60g is closed, the inlet vane 59 operates to reduce the opening of the vane so as to suppress the increase in the fluid amount. The increase in the speed of the motor 56 and the decrease in the opening of the inlet vane 59 are displaced, and the fluid amount is unnecessarily varied, but it is desired to reduce the frequency difference (Fc−Fv) at the switching time as low as possible so as to reduce the varied amount.

From this point of view, the embodiment in FIG. 13 is further improved from the arrangement in FIG. 12. More particularly, when the power detector 62 is operated in FIG. 13, the contacts 60b, 60f are first opened, the contacts 60c, 60g are closed, and a command is applied to the start command terminal 60h. Thus, before the power is switched, the function generator 60d is operated by the command applied to the start command terminal 60h to output a command to raise the frequency Fv of the V power source 52, thereby raising the frequency of the V power source 52 to the upper limit of the V power source 52. Thus, the frequency difference (Fc−Fv) is reduced to the limit. Since the contact 60g is closed at this time, the inlet vane 59 decreases in the opening in the amount corresponding to the increase in the frequency Fv, and this is effective to reduce the fluid variation at the switching time.

After the frequency Fv of the V power source 52 is raised to the upper limit, the switches 54, 55 are opened, the switch 53 is closed, and the power source is then switched from the V power source to the C power source. Thus, the frequency difference (Fc−Fv) at the switching time can be reduced as compared with that in case of FIG. 12. Since the opening of the inlet vane is reduced in advance to that corresponding to the upper limit frequency Fv, the necessary width of varying the opening of the inlet vane can be reduced, and the variation in the fluid amount at the switching time can be reduced less.

In the embodiment described above, the case of the fan for the boiler of a generating plant has been described. However, the present invention is not limited to the particular embodiment. The present invention may also be used for other utilities. For example, the same advantages as the above-described embodiment may be performed when the fan 57 may be generally any rotor including a pump and the inlet vane 59 may be a control mechanism such as a damper or a valve for regulating the load to be applied to the motor 56.

In the embodiment described above, the power detector 62 for detecting the safety limit of the output capacity of the V power source 52 has been described to detect the power by the voltage and the current in the primary system 51. However, since the voltage is substantially constant in the normal system, only the current may be detected. Further, even if any function such as the power or current of the V power source 52 at the output side, the number-of-revolution command value to the V power source 52, the number of revolution of the rotor 57, the current of the motor 56, or the output frequency or voltage of the V power source 52 may presume the output capacity of the V power source 52 may be employed, the same advantages as those in the abovementioned embodiments may be performed.

Figure 14:
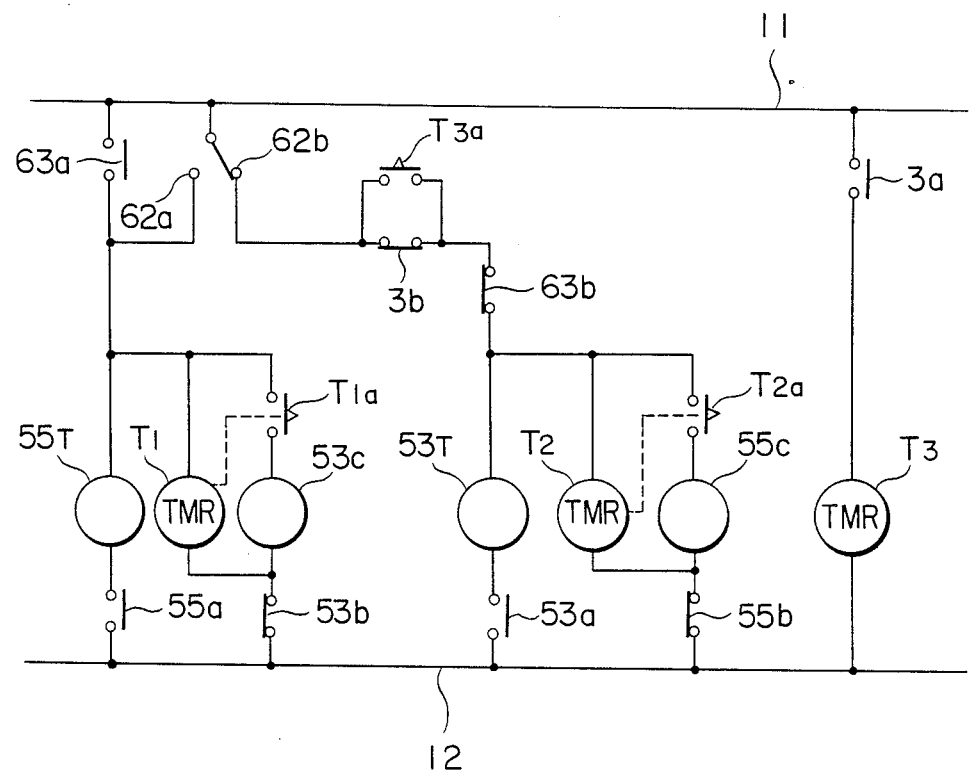
Figure 15:
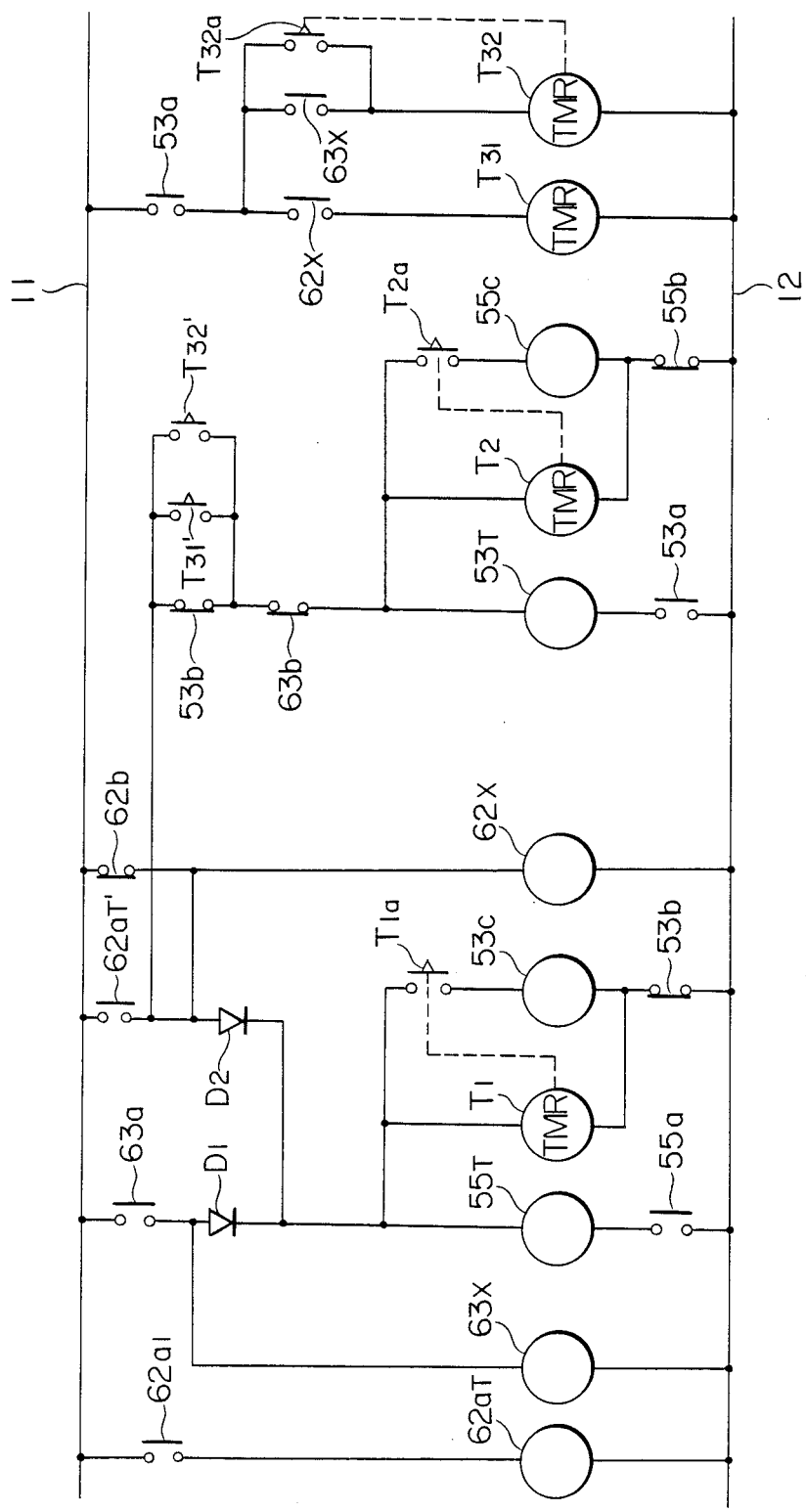

Still another embodiment of FIGS. 12 and 13 will be described with reference to FIGS. 14 and 15. In FIGS. 14 and 15, reference numerals 11, 12 designate (+), (−) buses of a control power source, reference characters 62a, 62b designate contacts closed and opened when the power detector 62 detects a predetermined value or higher of the power, reference characters 63a, 63b designate contacts closed and opened when a relay for applying the power source switching condition except the power detector 62 is operated, reference characters 53T, 55T designate trip coils of the switches 53, 55, reference characters 53c, 55c designate energizing coils of the switches 53, 55, reference characters 55a, 55b designate contacts closed and opened when the switch 55 is closed, reference characters 53a, 53b designate contacts closed and opened when the switch 55 is closed, reference characters $T_1$, $T_2$, $T_3$ designate timers, and reference characters $T_{1a}$, $T_{2a}$, $T_{3a}$ designate contacts of the timers $T_1$, $T_2$, $T_3$, respectively.

In FIG. 14, when the contact 62a or the contact 63a is closed, the switches 55, 53 are opened and closed, respectively by the trip coil 55T and the coil 53c in the same manner as the arrangements in FIGS. 12 and 13 to switch from the V power source 53 to the C power source 51. Then, when the load is immediately decreased and the contact 62b of the power detector 62 is closed, the contact 53b is opened by the closure of the switch 53. Therefore, the trip coil 53T and the coil 55c are not driven, and the operation of the motor 56 is continued by the C power source 51. The contact 53a is closed by the closure of the switch 53, the stopping of driving the coil 55c and the trip coil 53T by the contact 53b is released after the time limit $T_3$, and the switching to the V power source 52 is performed by the trip coil 53T and the coil 55c. The time limit $T_3$ is selected so that the overheat of the motor 56 generated when the switching from the V power source 52 to the C power source 51 is performed is sufficiently cooled.

FIG. 15 shows still another embodiment of FIG. 14, reference characters D1, D2 designate diodes, reference character 62aT designates an auxiliary timer driven by the contact 62a of the power detector 62, reference character 62aT' designates a contact of this timer, reference characters 62X, 63X designate auxiliary relays, reference characters $T_{31}$, $T_{32}$ designate timers, and reference characters $T_{31}'$, $T_{32}'$ designate contacts of these timers. When the contact 63a of the relay is closed, the auxiliary relay 63X is operated. Thus, the opening and closing of the switches 53, 55 are stopped during the timer time of the timer $T_{32}$. When the auxiliary timer 62aT of the power detector is closed, the auxiliary relay 62X is operated. The opening and closing of the switches 53, 55 are stopped during the timer time of the timer $T_{31}$. In this case, the power detector 62 is operated to raise the output frequency of the V power source 52 to the upper output limit of the V power source 53 (e.g., 80% of the number of revolution of the motor) until the auxiliary timer 62aT is operated.

Figure 16:
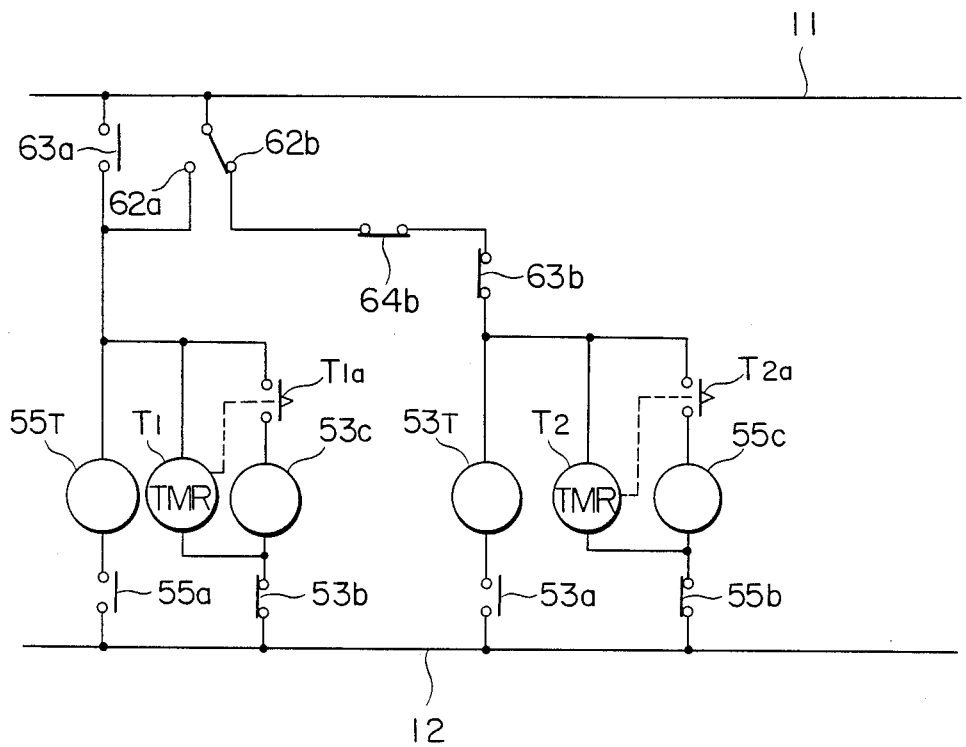

FIG. 16 shows still another embodiment of FIGS. 14 and 15. In FIG. 16, reference character 64b designates contact of a temperature detector (not shown) opened by the operating temperature detector (not shown) when the temperature of the motor is a predetermined value or higher. Other reference numerals and characters are the same as or equivalent to those in FIG. 12 and 13.

In FIG. 16, when the contact 62a or the contact 63a is closed, the switches 55, 53 are opened and closed, respectively by the trip coil 55T and the energizing coil 53C, and the V power source 52 is switched to the C power source 52. Then, if the motor 56 is raised at the temperature not durable for the next switching from the C power source 52 to the C power source 52 when the load is immediately decreased and the contact 62b of the power detector 62 is closed, the contact 64b of the temperature detector is opened, the trip coil 53T and the coil 55c are not driven, but the operation of the motor 56 by the C power source is continued. When the motor is cooled to the temperature durable for the next switching from the C power source 53 to the V power source 52, contact 64b of the temperature detector is closed, the stopping of driving the coil 55c and the trip coil 53T is released. When the contact 62b is closed at this time, the switching to the V power source 52 is performed by the trip coil 53T and the coil 55c.

In the embodiment described above, a number of switchings in a short time is inhibited by locking the switching when the temperature detector is operated by providing the temperature detector operated when the temperature of the motor is a predetermined value or higher. Thus, the power source switching system for preventing the abnormal overheat of the motor can be provided.

What is claimed is:

1. A system for controlling a motor which drives a fan of a ventilation arrangement having an adjustable vane for regulating wind volume and which operates in one of at least first and second modes of operation, the controlling system comprising:

detector means for generating a first signal when the opening of the vane is greater than a first predetermined value and a second signal when the opening of the vane is less than a second predetermined value;

means for supplying control power; and first and second circuits connected in parallel across the power supplying means and respectively including first and second switching means responsive to energization by the control power for respectively switching the motor to the first and second modes of operation, the first circuit further including a first contact means which closes when the first switching means is energized, second contact means which opens when the second switching means is energized, third contact means which opens in response to the second signal from the detector means, and fourth contact means which closes in response to the first signal and the first circuit having the first switching means and the first, second, and third contact means arranged in series with the fourth contact means arranged in parallel across the first contact means, the second circuit further including a first contact means which opens when the first switching means is energized, a second contact means which closes when the second switching means is energized, third contact means which opens in response to the first signal, and fourth contact means which closes in response to the second signal and the second circuit having the second switching means and the first, second, and third contact means arranged in series with the fourth contact means arranged in parallel across the second contact means.

2. The controlling system of claim 1 wherein the first switching means includes first and second operating coils connected in parallel and wherein the second switching means comprises a single operating coil.

* * * * *

UNITED STATES PATENT AND TRADEMARK OFFICE
CERTIFICATE OF CORRECTION

PATENT NO. : 4,977,363

DATED : December 11, 1990

INVENTOR(S) : Takada et al.

It is certified that error appears in the above-identified patent and that said Letters Patent is hereby corrected as shown below:

ON TITLE PAGE:

In item [75] change "Toshihiko" to --Yoshihiko--.

Claim 1, column 13, replace with
--A system for controlling a motor which drives a fan of a ventilation arrangement having an adjustable vane for regulating wind volume and which operates in one of at least first and second modes of operation, the controlling system comprising:

detector means for generating a first signal when the opening of the vane is greater than a first predetermined value and a second signal when the opening of the vane is less than a second predetermined value;

means for supplying control power and motor power; and first and second normally open circuits connected in parallel across the control power supplying means and respectively including first and second switching means which are energized by the control power supplying means when their respective circuits are completed and are connected to switches in the motor power supplying means for respectively switching the motor to the first and second modes of operation and to contact means in the respective circuits, the first circuit including a first contact means which closes when the first switching means is energized to maintain the first circuit completed, second contact means which opens when the second switching means is energized to open the first circuit, third contact means which opens in response to the second signal from the detector means to open the first circuit, and fourth contact means which closes in response to the first signal to complete the first circuit and energize the first switching means;

UNITED STATES PATENT AND TRADEMARK OFFICE
CERTIFICATE OF CORRECTION

PATENT NO. : 4,977,363

DATED : December 11, 1990

INVENTOR(S) : Takada et al.

It is certified that error appears in the above-identified patent and that said Letters Patent is hereby corrected as shown below:

the first circuit having the first switching means and the first, second, and third contact means arranged in series with the fourth contact means arranged in parallel across the first contact means;
    the second circuit including a first contact means which opens when the first switching means is energized to open the second circuit, a second contact means which closes when the second switching means is energized to maintain the second circuit completed, third contact means which opens in response to the first signal to open the second circuit, and fourth contact means which closes in response to the second signal to complete the second circuit and thereby energize the second switching means;
    the second circuit having the second switching means and the first, second, and third contact means arranged in series with the fourth contact means arranged in parallel across the second contact means.--

Signed and Sealed this

Twenty-first Day of July, 1992

*Attest:*

DOUGLAS B. COMER

*Attesting Officer*    *Acting Commissioner of Patents and Trademarks*